United States Patent
Ku et al.

(10) Patent No.: US 6,171,566 B1
(45) Date of Patent: Jan. 9, 2001

(54) SELECTIVE CATALYTIC REDUCTION FOR THE REMOVAL OF NITROGEN OXIDES AND CATALYST BODY THEREOF

(75) Inventors: Bon cheol Ku; Young Woo Kim; Young Tack Choi, all of Taejon (KR)

(73) Assignee: SK Corporation, Seoul (KR)

(*) Notice: Under 35 U.S.C. 154(b), the term of this patent shall be extended for 0 days.

(21) Appl. No.: 09/462,763

(22) PCT Filed: Jul. 10, 1997

(86) PCT No.: PCT/KR97/00135

§ 371 Date: Jan. 10, 2000

§ 102(e) Date: Jan. 10, 2000

(87) PCT Pub. No.: WO99/02258

PCT Pub. Date: Jan. 21, 1999

(51) Int. Cl.$^7$ .................................. C01B 21/00
(52) U.S. Cl. ............... 423/239.1; 502/305; 502/312; 502/313; 502/314; 502/315; 502/316; 502/321; 502/322
(58) Field of Search ............... 423/239.1; 502/305, 502/312, 313, 314, 315, 316, 321, 322

(56) References Cited

U.S. PATENT DOCUMENTS

| | | |
|---|---|---|
| 3,993,572 | 11/1976 | Hindin et al. ............... 252/462 |
| 4,010,238 | 3/1977 | Shiraishi et al. ............... 423/239 |
| 4,018,710 | 4/1977 | Oshimura et al. ............... 252/439 |
| 4,048,112 | 9/1977 | Matsushita et al. ............... 252/461 |
| 4,052,337 | 10/1977 | Nishikawa et al. ............... 252/455 |
| 4,085,193 | 4/1978 | Nakajima et al. ............... 423/239 |
| 5,028,314 | * 7/1991 | Goldbereger et al. ............ 208/216 R |
| 5,340,554 | * 8/1994 | Carnell ............... 423/235 |
| 5,869,419 | * 2/1999 | Obayashi et al. ............... 502/305 |

* cited by examiner

*Primary Examiner*—Tom Dunn
(74) *Attorney, Agent, or Firm*—Abelman, Frayne & Schwab

(57) ABSTRACT

A selective catalytic reduction body for the removal of nitrogen oxides ($NO_x$), comprising about 5 to 80% by weight of vanadium, about 0 to 60% by weight of molybdenum, about 0 to 20% by weight of nickel and about 0 to 20% by weight of cobalt, which catalytic body is economically favorable in production cost and superior in removing the nitrogen oxides from exhaust gas, can keep is activity high for a long time by virtue of excellent thermal resistance and poison resistance to sulfur oxides and other chemicals, exhausts un-reacted ammonia and heavy metal fly ash at the lowest amount, and allows the catalyst volume necessary to obtain the same removal degree and the pressure loss attributed to the volume to be minimized.

3 Claims, No Drawings

SELECTIVE CATALYTIC REDUCTION FOR THE REMOVAL OF NITROGEN OXIDES AND CATALYST BODY THEREOF

BACKGROUND OF THE INVENTION

1. Field of the invention

The present invention relates to a selective catalytic reduction for the removal of nitrogen oxides ($NO_x$) and a catalyst body thereof. More particularly, the present invention relates to a selective catalytic reduction for the removal of nitrogen oxides, prepared from a spent catalyst composition from heavy oil upgrading facilities of an oil refinery after a hydro-desulfurization process, superior in thermal and chemical stability and economically favorable in production cost and a catalyst body comprising the same.

2. Description of the Prior Art

Nitrogen oxides are inevitably generated in the plants which employ fossil fuels, such as power plants and chemical plants. Nitrogen oxides are found to be an immediate cause of the air pollution, such as acid rain and smog, and the permissible discharge standard, therefore has recently been strengthened.

Generally, nitrogen oxides are generated upon the oxidation of nitrogen monooxides in a high temperature combustion equipment or the reaction of nitrogen with oxygen in an excess of air. To eliminate the root of nitrogen oxides, there have been made many attempts for the improvement of the combustion condition, such as low oxygen combustion and exhaust gas circulation. However, the nitrogen oxides cannot be completely eliminated only by the improvement in combustion technique and thus, there are developed and suggested various post-treatment techniques by which the exhaust gas is deprived of nitrogen oxides.

Depending on whether a solution is used or not, techniques for denitrifying exhaust gas are classified generally into two: wet method and dry method. Now, it is known that the latter is more advantageous in investment, operation cost, and the treatment of secondary waste than the former. Of them, the most frequently used technique is the selective catalytic reduction in which nitrogen oxides are decomposed into water and nitrogen in the presence of a catalyst using ammonia as a reducing agent.

As many as tens of selectively reducing catalysts have been disclosed in patents, thus far and they are very various in types and shapes. According to a general classification, there are catalysts containing the precious metals of the platinum group, catalysts containing the oxides of metals, such as iron, cobalt, nickel and molybdenum, zeolite catalysts containing ion-exchanged copper, and catalysts consisting mainly of vanadium and titanium.

U.S. Pat. No. 3,993,572 discloses a catalyst containing a metal of the platinum group, a rare-earth metal and alumina, which is impregnated in a carrier such as ceramic honeycomb.

U.S. Pat. No. 4,018,710 discloses a catalyst comprising a cerium oxide and a nickel oxide in combination with various amounts of rhodium or ruthenium. The patent also suggests that a metal sulfide, such as copper sulfide or potassium sulfide, may be added to the catalyst in order to prevent ammonia from occurring.

U.S. Pat. No. 4,052,337 discloses a catalyst comprising a natural or synthetic zeolite ion-exchanged with copper or alkali metal, which is useful to remove nitrogen oxides in the presence of ammonia.

In U.S. Pat. No 4,010,238 is disclosed that the nitrogen oxides are selectively removed from exhaust gas by use of a metal oxide catalyst in which vanadium is combined with one selected from the group consisting of copper, zinc, tin, lead, titanium, phosphorus, chrome, iron, cobalt and nickel.

U.S. Pat. No. 4,048,112 introduces a catalyst comprising a vanadium oxide impregnated in a titanium oxide carrier of an anatase form, with which nitrogen oxides can be removed out of exhaust gas in the presence of ammonia.

U.S. Pat. No. 4,085,193 describes a catalyst in which titania is combined with at least one selected from the oxides of molybdenum, tungsten, iron, vanadium, nickel, cobalt, copper, chrome and uranium.

Although the catalysts and processes described in the above-cited patents are well known in the aspect of technical perfection and commercialization and frequently put in practice, it is widely recognized the need of a more improved catalyst when considering the thermal resistance required for the treatment of hot exhaust gas, the durability to the heavy metals or sulfur oxides of exhaust gas, the secondary pollution attributable to the use of catalyst and ammonia, and economical profit.

SUMMARY OF THE INVENTION

Intensive research repeated by the present inventors aiming to develop a cheap catalyst superior in removing nitrogen oxides out of exhaust gas resulted in the finding that the catalyst composition wasted from the heavy oil upgrading facilities of an oil refinery after a hydro-desulfurization process is capable of selectively reducing nitrogen oxides in the exhaust gas with a high efficiency.

Therefore, it is an object of the present invention to provide a selective catalytic reduction for the removal of nitrogen oxides.

It is another object of the present invention to provide the selective catalytic reduction body for the removal of nitrogen oxides, which is superior to conventional catalysts in removing the nitrogen oxides, can keep its activity high for a long time by virtue of excellent thermal resistance and poison resistance to sulfur oxides and other chemicals, exhausts un-reacted ammonia and heavy metal fly ash at the lowest amount, and allows the catalyst volume necessary to obtain the same removal degree and the pressure loss attributed to the volume to be minimized.

It is a further object of the present invention to provide a method for removing nitrogen oxides out of exhaust gas containing oxygen and nitrogen oxides to selectively reduce the nitrogen oxides into nitrogen.

In accordance with an aspect of the present invention, there is provided a selective catalytic reduction for the removal of nitrogen oxides, which has a size of about 100 to 800 mesh and comprises about 5 to 80% by weight of vanadium, about 0 to 60% by weight of molybdenum, about 0 to 20% by weight of nickel and about 0 to 20% by weight of cobalt.

In accordance with another aspect of the present invention, there is provided a selective catalytic reduction body for the removal of nitrogen oxides, which comprises about 5 to 40% by weight of vanadium, about 0.1 to 10% by weight of molybdenum, about 0.1 to 5% by weight of iron, about 0.1 to 5% by weight of nickel, about 20 to 50% by weight of alumina, and about 0.1 to 2% by weight of cobalt.

In accordance with still another aspect of the present invention, there is provided a method for removing nitrogen oxides out of exhaust gas containing oxygen and nitrogen oxides, wherein said exhaust gas is flowed through the catalyst body of the present invention at a temperature of 200 to 400° C. in the presence of ammonia, to selectively reduce the nitrogen oxides into nitrogen and water.

DETAILED DESCRIPTION OF THE INVENTION

A spent catalyst composition from heavy oil upgrading facilities of an oil refinery after a hydro-desulfurization process, typically comprises vanadium, molybdenum, nickel, cobalt, alumina and trace elements. For example, the amount of vanadium in the spent catalyst ranges from about 0 to 80%, molybdenum from about 0 to 80 %, nickel from about 0 to 20%, cobalt from about 0 to 10%, alumina from about 0 to 99% and trace elements. Besides the above components, impurities, such as moisture, oil and sulfur compounds, are present in the spent catalyst composition.

In order to convert the spent catalyst composition into a useful catalyst of the present invention, the impurities should be eliminated. For this, the spent catalyst composition is preferably heated at a temperature of about 400 to 900° C. for about 0.5 to 5 hours and then, pulverized to a powder with a size of about 100 to 800 mesh. For example, if the heating temperature is below 400° C., the impurities are incompletely removed. On the other hand, if the heating temperature is higher than 900° C., not only is energy wasted but the catalytic components in the spent catalyst composition are deleteriously affected. In addition, when the powder is less than 100 mesh in size, it is difficult to obtain a homogeneously mixed slurry in a subsequent process. If the powder is more than 800 mesh in size, it becomes poor in durability at high temperature.

According to uses, such spent catalyst composition as pre-treated above is formulated within the chemical composition range comprising about 5 to 80% of vanadium, about 0 to 60% of molybdenum, about 0 to 20% of nickel, and about 0 to 20% of cobalt. The resulting composition is then used as a material for a deposit support and a catalyst body of the present invention.

Therefore, the selective catalytic reduction prepared as above ranges, in size, from about 100 to 800 mesh and comprises about 5 to 80% by weight of vanadium, about 0 to 60% by weight of molybdenum, about 0 to 20% by weight of nickel and about 0 to 20% by weight of cobalt based on the total weight of the powder.

A catalyst body can be prepared, as mentioned above, from the selective catalytic reduction by a method, wherein the catalyst powder is mixed with water at a predetermined ratio to give a catalyst slurry which is subsequently deposited in a ceramic honeycomb, followed by calcining the ceramic honeycomb.

In more detail, first, the catalyst powder is mixed with about 50 to 500% by weight of water and then, added with alkali or acid to give a slurry having a viscosity of 40 to 400 cps and a pH of about 3 to 6. By virtue of the adjustment in viscosity and pH, the catalyst slurry can be deposited in a ceramic honeycomb with excellent adhesive strength and uniformity in distribution.

Thereafter, the catalyst slurry is deposited in a ceramic honeycomb at an amount of about 5 to 200 g per liter of the ceramic honeycomb and then, calcined at about 100 to 800° C. and preferably at 400 to 600° C., to yield a catalyst body. When the catalyst slurry is deposited in the honeycomb less than an amount of 5 g/liter, the resulting catalyst body has an insufficient surface area so that its catalytic activity is lowered. On the other hand, deposition of more than 200 g of the catalyst slurry per liter of the honeycomb requires excess gas pressure, lowering the operation efficiency of the process.

The selective catalytic reduction body thus obtained by the above procedure comprises about 5 to 40% by weight of vanadium, about 0.1 to 10% by weight of molybdenum, about 0.1 to 5% by weight of iron, about 0.1 to 5% by weight of nickel, about 20 to 50% by weight of alumina and about 0.1 to 2% by weight of cobalt.

When exhaust gas containing oxygen and/or nitrogen oxide is treated in a reactor loaded with the catalyst body while supplying ammonia to the reactor, nitrogen oxides are selectively reduced out of the exhaust gas.

Consequently, when the exhaust gas generated from the plants which employ fossil fuels is treated with the catalyst body of the present invention, it is superior in stability to high temperature and chemical stability to the sulfur oxides contained in the exhaust gas, so that it can remove nitrogen oxide out of the exhaust with a high efficiency while keeping its ability to selectively reduce nitrogen oxide for a long time. A significant advantage of the present invention is that the catalyst body of the present invention is very economically favorable because it is prepared from the spent catalyst composition, a by-product of an oil refinery.

A better understanding of the present invention may be obtained in light of following examples which are set forth to illustrate, but are not to be construed to limit, the present invention.

EXAMPLE 100 kg of a spent catalyst composition from heavy oil upgrading facilities after hydro-desulfurization process, was heated at an elevation rate of 20° C./min up to about 550° C. which was maintained for about 2 hours and, then, cooled in a furnace. The resulting composition was pulverized into a powder with a size of 200 mesh. An ICP analysis showed that it had a chemical composition as given in Table 1 below.

TABLE 1

Chemical Composition of Spent Catalyst (ICP Analysis)

| Elements | Al | V | Fe | Ni | Co | Mo | O | others |
|---|---|---|---|---|---|---|---|---|
| Content (wt %) | 31.7 | 11.3 | 0.5 | 3.4 | 0.8 | 2.7 | 26.3 | 23.3 |

Table 2 below showed the change of the specific surface area of the spent catalyst with temperature. As shown, the heating at a temperature lower than 500° C. could not remove impurities completely whereas the heating at a temperature as high as or higher than 1,000° C. degraded the catalyst components, destroying the pores of the catalyst.

TABLE 2

Change of Specific Surface Area in Spent Catalyst with Heating Temperature

| Heating Temp. | BET Area (m²/g) | Diameter of pore (Å) | Volume of pore (cc/g) |
|---|---|---|---|
| — | 20.2 | 66 | 0.067 |
| 300 | 9.50 | 127 | 0.060 |
| 500 | 13.3 | 114 | 0.076 |
| 800 | 18.7 | 116 | 0.108 |
| 1000 | 0.81 | — | — |
| 1100 | 0.82 | — | — |

According to uses, the spent catalyst as pre-treated above was formulated within a chemical composition comprising 5 to 80% of vanadium, 0 to 60% of molybdenum, 0 to 20% of nickel and 0 to 20% of cobalt to give a series of catalyst powders (hereinafter referred to as "YK-R"), as shown in Table 3 below.

TABLE 3

Chemical Composition of YK-R

| Catalyst | Al | V | Fe | Ni | Co | Mo | O | Cr | Cu | Others |
|---|---|---|---|---|---|---|---|---|---|---|
| YK-R-1 | 31.7 | 11.3 | 0.5 | 3.4 | 0.8 | 2.7 | 26.3 | 0.7 | 0 | balance |
| YK-R-2 | 31.7 | 11.3 | 1.1 | 3.4 | 0.8 | 2.7 | 26.3 | 0.7 | 0 | balance |
| YK-R-3 | 31.7 | 11.3 | 2.2 | 3.4 | 0.8 | 2.7 | 26.3 | 0.7 | 0 | balance |
| YK-R-4 | 31.7 | 11.3 | 0.5 | 3.4 | 0.8 | 2.7 | 26.3 | 1.1 | 0 | balance |
| YK-R-5 | 31.7 | 11.3 | 0.5 | 3.4 | 0.8 | 2.7 | 26.3 | 2.2 | 0 | balance |
| YK-R-6 | 31.7 | 11.3 | 0.5 | 3.4 | 0.8 | 2.7 | 26.3 | 0.7 | 0.5 | balance |

A ceramic honeycomb monolith with 400 cpsi was cut into a dimension of. 2.5 cm×2.5 cm×2.5 cm. Separately, 1000 g of YK-R-1 powder was mixed with 900 g of water and pulverized for 24 hours to give a slurry which was, then, added with conc. acetic acid and ammonia water with stirring, in order to control its pH and viscosity to 4.5 and 95 cps, respectively. The ceramic honeycomb monolith was plunged in the slurry and heated at a heating rate of 20° C./min up to 120° C. which was maintained for 10 hours, and then up to 550° C. which was maintained for 2 hours. As a result, a catalyst specimen in which 1.3 g of the YK-R-1 was impregnated was prepared.

CATALYST ACTIVITY TEST

1. Test Condition

The catalyst specimen obtained in Example was filled in the center of a reactor which was, then, fed with reaction gas having such a gas composition as given in Table 4 below. Under the reaction condition of Table 4, the catalyst specimens were tested for the activity of NO removal and the results are given as shown in Table 5, below.

When preparing the deposit support, the catalyst was calcined at a temperature of 400° C., 500° C. and 600° C., to produce Sample 1, Sample 2 and Sample 3, respectively.

TABLE 4

Test Condition

| Reaction Condition | | Gas Composition | | | | |
|---|---|---|---|---|---|---|
| Space Velocity ($hr^{-1}$) | React. Temp. (° C.) | NO (ppm) | $NH_3$ (ppm) | $SO_2$ (%) | $O_2$ (%) | $N_2$ (%) |
| 10,000–50,000 | 150–500 | 1000 | 1000 | 0–10 | 1–10 | balance |

2. Results of Activity Test

After the activity test for the removal of NO, an analysis for the catalysts of different calcining temperatures showed that the catalyst calcined at a temperature of 400 to 600° C. had a conversion efficiency of 98% or more, the highest conversion efficiency of the catalysts, at a reaction temperature of 270 to 320° C. In contrast, the catalysts calcined at a temperature either higher than 600° C. or lower than 400° C. were of poor activity. As for the reaction temperature, it was obtained by averaging the inlet temperature and the outlet temperature of the reactor.

The conversion efficiency according to the reaction temperatures and the calcining temperatures is given as shown in Table 5 below.

TABLE 5

Test Result of Catalyst Activity

| | | NO Removal (%) | | |
|---|---|---|---|---|
| Space Velocity ($hr^{-1}$) | Reaction Temp. (° C.) | Sample 1 400° C. | Sample 2 500° C. | Sample 3 600° C. |
| 25,000 | 200 | 59.2 | 72.2 | 58.5 |
| 25,000 | 250 | 81.8 | 92.8 | 83.8 |
| 25,000 | 300 | 93.2 | 97.5 | 94.6 |
| 25,000 | 350 | 94.1 | 90.7 | 84.4 |
| 25,000 | 400 | 66.5 | 41.7 | 28.9 |

As apparent from the above data, the best catalyst activity was obtained when the pre-treatment condition of spent catalyst was 500° C. Table 6 below shows the conversion rates of a series of YK-Rs which each were pre-treated at 500° C. but different in chemical composition.

TABLE 6

Activity according to Catalyst Composition

| Reaction | NO Removal (%) | | | | | |
|---|---|---|---|---|---|---|
| Temp. (° C.) | YK-R-1 | YK-R-2 | YK-R-3 | YK-R-4 | YK-R-5 | YK-R-6 |
| 200 | 72.2 | 55 | 60.4 | 55 | 50 | 72.2 |
| 250 | 92.8 | 80 | 85 | 80 | 72 | 92 |
| 300 | 97.5 | 90.2 | 95 | 92 | 87 | 95 |
| 350 | 90.7 | 90 | 90 | 95 | 90 | 91 |
| 400 | 67.7 | 75 | 70 | 85 | 80 | 65 |

$SO_2$ ADSORPTION TEST

To compare the $SO_2$ adsorption of alumina, zeolite, titania and a catalyst prepared from YK-R-1, $SO_2$ gas was flowed through a U-shaped glass reactor and the amounts of $SO_2$ adsorbed were measured by using a thermal conductivity detector. The adsorbed amounts at room temperature were in the order of alumina>zeolite>titania>YK-R-1. From this analysis that YK-R-1 adsorbed little $SO_2$ while alumina did a lot, it could be deduced that the active point of the catalyst from YK-R-1 was minimally occupied by $SO_2$ so that it was of large poison resistance to sulfur dioxide. 10 mim after flowing $SO_2$, the adsorbed amounts are measured and the results are given as shown in Table 7 below.

TABLE 7

$SO_2$ ADSORPTION TEST (300° C.)

| Catalytic Element | Alumina | Zeolite | Titania | YK-R-1 |
|---|---|---|---|---|
| Adsorption (Id Units) | 2340 | 600 | 240 | 72 |

$SO_2$ INACTIVATION AND LONG-TERM DURABILITY TEST

While being exposed to 1% $SO_2$, the YK-R-1 catalyst was subjected to the same activity test as above. The activity of the catalyst was found to be little changed. The results are given as shown in Table 8 below.

TABLE 8

Change of Catalytic Activity with SO$_2$-Exposure Time

| Temp. (° C.) | Exposure Time | | | | | |
|---|---|---|---|---|---|---|
| | 0 hr | 6 hr | 15 hr | 2 days | 3 days | 4 days |
| 200 | 72.2 | 55.5 | 48.8 | 48.5 | 50.2 | 51.2 |
| 250 | 92.2 | 80.6 | 74.9 | 74.8 | 75.7 | 77.7 |
| 300 | 97.5 | 94.2 | 91.5 | 88.7 | 90.9 | 91.9 |
| 350 | 90.7 | 97.6 | 95.4 | 78.4 | 95.1 | 95.8 |
| 400 | 41.7 | 87.9 | 86.6 | 57.5 | 88.1 | 87.8 |

As described hereinbefore, the catalyst of the present invention is superior to conventional catalysts in removing nitrogen oxides and can keep its activity high for a long time by virtue of excellent thermal resistance and poison resistance to sulfur oxides and other chemicals. In addition, the catalyst reactor loaded with the catalyst exhausts un-reacted ammonia and heavy metal fly ash at the lowest amount. Further, the catalyst of the present invention is very economically favorable in production cost. Another advantage of the present invention is that the catalyst volume necessary to obtain the same removal degree and the pressure loss attributed to the volume are minimized.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A selective catalytic reduction for the removal of nitrogen oxides, which has a size of about 100 to 800 mesh and comprises about 5 to 80% by weight vanadium, about 0 to 60% by weight of molybdenum, about 0 to 20% by weight of nickel and about 0 to 20% by weight of cobalt, prepared from a spent catalyst composition from heavy oil upgrading facilities of an oil refinery after a hydro-desulfurization process.

2. A selective catalytic reduction honeycomb for the removal of nitrogen oxides, which comprises about 5 to 40% by weight of vanadium, about 0.1 to 10% by weight of molybdenum, about 0.1 to 5% by weight of iron, about 0.1 to 5% by weight of nickel, about 20 to 50% by weight of alumina, and about 0.1 to 2% by weight of cobalt, prepared from a spent catalyst composition from heavy oil upgrading facilities of an oil refinery after a hydro-desulfurization process.

3. A method for removing nitrogen oxides out of exhaust gas containing oxygen and nitrogen oxides, wherein said exhaust gas is flowed through the selective catalytic reduction honeycomb of claim 2 at a temperature of 200 to 400° C. in the presence of ammonia, to selectively reduce the nitrogen oxides into nitrogen and water.

* * * * *